US 6,485,092 B2

(12) United States Patent
Iimori et al.

(10) Patent No.: US 6,485,092 B2
(45) Date of Patent: Nov. 26, 2002

(54) AUTOMOTIVE LIGHT TRANSMITTING PANEL MOUNTING STRUCTURE

(75) Inventors: Yasushi Iimori, Aichi-ken (JP); Hiroshi Kuno, Aichi-ken (JP); Kazumasa Okumura, Aichi-ken (JP); Toru Takao, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/843,311

(22) Filed: Apr. 26, 2001

(65) Prior Publication Data
US 2001/0037606 A1 Nov. 8, 2001

(30) Foreign Application Priority Data
Apr. 28, 2000 (JP) ........................................ 2000-131104

(51) Int. Cl.[7] ................................................ B60J 10/10
(52) U.S. Cl. .................................................. 296/216.09
(58) Field of Search ..................................... 296/216.09

(56) References Cited

U.S. PATENT DOCUMENTS 4,375,899 A * 3/1983 Kajiyama et al. ... 296/216.09 X
5,538,317 A * 7/1996 Brocke et al. ......... 296/216.09
5,992,928 A * 11/1999 Kato et al. ............. 296/216.09
6,283,540 B1 * 9/2001 Siebelink, Jr. .............. 296/191

FOREIGN PATENT DOCUMENTS

| JP | 62-194957 | 8/1987 |
| JP | 63-40229 U | 3/1988 |
| JP | 63-40230 U | 3/1988 |
| JP | 63-64848 | 3/1988 |

* cited by examiner

Primary Examiner—Dennis H. Pedder
(74) Attorney, Agent, or Firm—Woodcock Washburn LLP

(57) ABSTRACT

A light transmitting panel mounting structure for mounting a transmitting panel is provided with a frame having a mounting flange, a light transmitting panel bonded relatively movably to the frame and a weather strip held by the mounting flange of the frame for sealing a space between the frame and the light transmitting panel. The weather strip has a body portion, a leg portion extending from the body portion to face the body portion for clamping the mounting flange of the frame in cooperation with the body portion, and a hollow lip having a hollow cross-sectional shape and projecting from the leg portion in elastic contact with an end face of the light transmitting panel. The hollow lip has a bent portion that is collapsible while shifting toward the leg portion when the hollow lip is subjected to an external force, and the bent portion is provided with a groove for assisting the collapsing action.

6 Claims, 6 Drawing Sheets

AUTOMOTIVE LIGHT TRANSMITTING PANEL MOUNTING STRUCTURE

BACKGROUND OF THE INVENTION

1. Field of the Invention

The present invention relates to a light transmitting panel mounting structure of, for example, a light-transmitting panel of an automotive sunroof or other similar automotive light transmitting panels and a light transmitting panel assembling method.

2. Description of the Related Art

In general, a sunroof provided in a ceiling of an automotive vehicle is composed of a substantially rectangular frame made of metal, a sunroof panel bonded with adhesives to this frame for introducing light (panel made of glass or synthetic resin), and a weather strip mounted on the frame for sealing an outer circumferential edge portion of the panel.

Then, in the case where a synthetic resin made panel having a higher linear expansion coefficient than a glass made panel is used as a sunroof panel, since the panel is expanded or shrunken in accordance with a level of the temperature, it is known that a lip that may be elastically deformed in contact with an outer circumferential end face of the panel is provided on an inner circumferential surface of the weather strip to thereby cope with the expansion/shrinkage of the panel. Incidentally, in this case, in order to enhance the followability of the lip to the expansion/shrinkage shift of the sunroof panel, the lip may be a hollow lip in some cases.

FIGS. 7A and 7B exemplify a panel assembling method in the case where a sunroof panel 103 is assembled into a loop-like weather strip 101 in which a hollow lip 102 is formed on the inner circumferential surface. As shown in FIG. 7A, the weather strip 101 is set on a receiving jig 104 by a weather strip positioning jig 105 with its back surface side reversed (inverted) upwardly. The substantially planar sunroof panel 103 is lowered onto the receiving jig 104 from above toward the weather strip 101.

In this case, in order to absorb the positional displacement of assembling or to keep the sealability in the assembling condition (to bring the hollow lip 102 into contact with the panel end face under the deformed condition), a lap amount a is set so that the tip end of the hollow lip 102 is partially overlapped with the edge of the sunroof panel 103. Then, when the sunroof panel 103 is lowered, the hollow lip 102 is pushed outwardly by the edge of the sunroof panel 103.

However, at this time, a so-called biting phenomenon in which the hollow lip 102 is not pushed outwardly but the edge of the sunroof panel 103 rides over the hollow lip 102 may occur. If such a biting phenomenon occurs, it takes long time to repair this, resulting in degradation in productivity.

SUMMARY OF THE INVENTION

Accordingly, in view of the above-described problems inherent in the prior art, an object of the present invention is to provide a light transmitting panel mounting structure that is available in avoiding a biting phenomenon of a hollow lip when a panel is to be mounted on a weather strip and a light transmitting panel assembling method therefor.

In order to attain this and other objects, according to the present invention, there is provided a light transmitting panel mounting structure for mounting a light transmitting panel to a frame comprising: a frame having a mounting flange; a light transmitting panel bonded relatively movably to the frame; and a weather strip held by the mounting flange of the frame for sealing a space between the frame and the light transmitting panel, the weather strip including: a body portion; a leg portion extending from the body portion to face the body portion for clamping the mounting flange of the frame in cooperation with the body portion; and a hollow lip having a hollow cross-sectional shape and projecting from the leg portion in contact with elastic contact with an end face of the light transmitting panel, the hollow lip having a bent portion that is collapsible while shifting toward the leg portion when the hollow lip is subjected to an external force, the bent portion being provided with a groove for assisting the collapsing action.

Also, according to the present invention, there is provided a light transmitting panel assembling method for inserting a light transmitting panel from a back surface side to an inner circumference of a weather strip provided with a hollow lip along an inner circumferential portion in the form of a loop to thereby assemble the light transmitting panel to the weather strip, comprising the steps of: sucking air within a hollow portion of the hollow lip of the weather strip to thereby collapse the hollow lip to the outside; inserting the light transmitting panel into the inner circumferential portion of the weather strip under the condition that the hollow lip is collapsed; and stopping the suction of air within the hollow portion of the hollow lip and introducing the air into the hollow portion to return the hollow lip to the original shape, thereby bringing the hollow lip into elastic contact with an end face of the light transmitting panel.

DESCRIPTION OF THE PREFERRED EMBODIMENTS

An automotive light transmitting panel mounting structure in accordance with first to fourth embodiments will now be described with reference to the accompanying drawings.

Incidentally, in each of the embodiments, a sunroof panel provided in an automotive sunroof will be described.

First Embodiment

Figure 1:
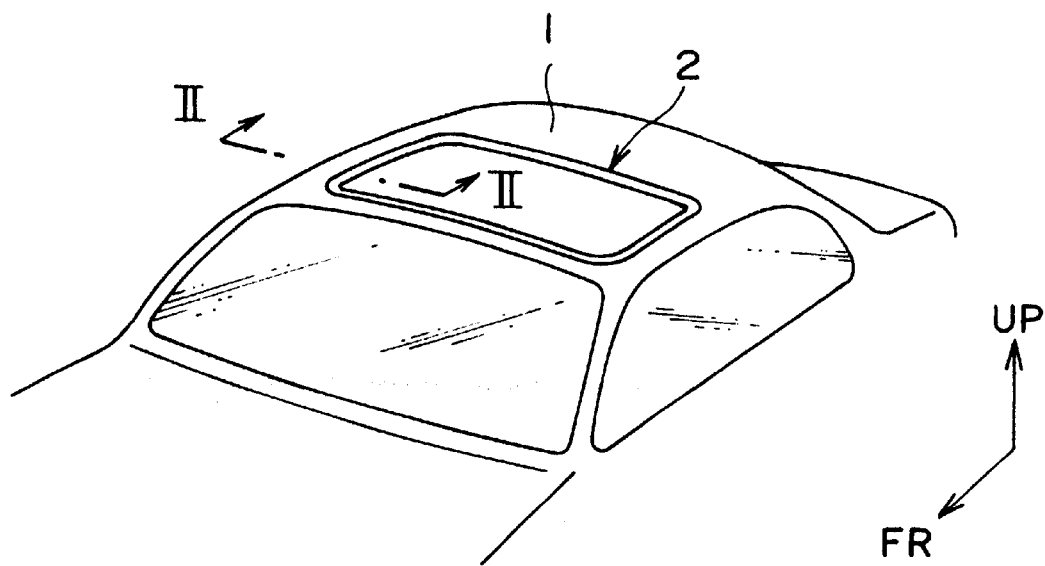
FIG. 1 is a top perspective view of a roof of an automotive vehicle with a sunroof.
Figure 2:
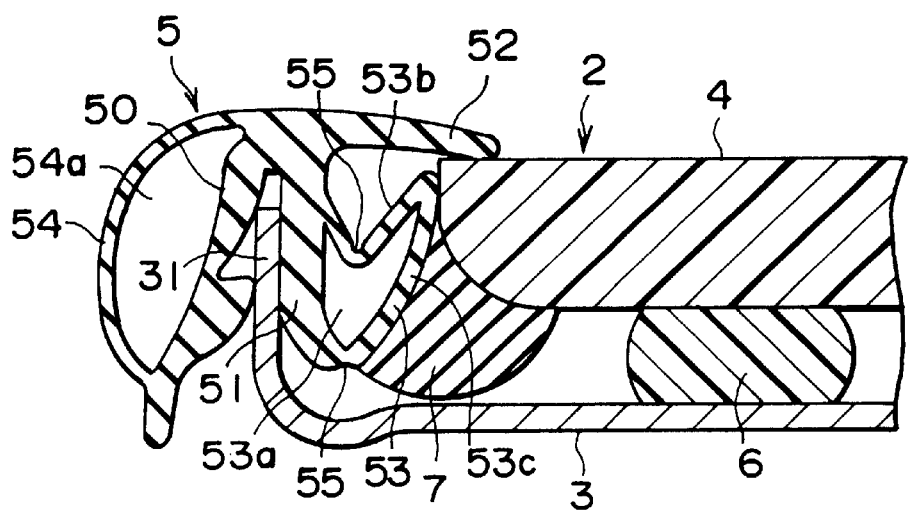
FIG. 2 is a cross-sectional view taken along the line II—II of FIG. 1 showing a light transmitting panel mounting structure in accordance with a first embodiment of the present invention.

In FIG. 1, there is shown a roof of an vehicle with a sunroof in which an arrow FR indicates a front side of the vehicle and an arrow UP indicates the upper side of the vehicle. A rectangular sunroof opening portion that is long in width direction of the vehicle is formed in a roof panel 1 made of iron plate. A sunroof 2 is arranged for opening/closing the opening portion. As shown in FIG. 2, the sunroof 2 is composed of a frame 3 made of metal in the form of, for example, a iron plate or the like, a sunroof panel 4 bonded to the frame 3 with adhesives 6 for introducing light, and a weather strip 5 mounted on the frame 3 for sealing.

The frame 3 is formed substantially into a rectangular frame. A mounting flange 31 bent upwardly is formed along the overall circumference thereof. The sunroof panel 4 is made of, for example, synthetic resin such as polycarbonate resin, acrylic resin, or polymethylmethacrylate resin in the form of a substantially rectangular shape and is disposed at a predetermined interval to the inner circumference of a mounting flange 31 of the frame 3.

The weather strip 5 has a body portion 50, a leg portion 51 projecting to face the body portion 50, a surface side lip 52 in contact with the outer circumferential edge of the sunroof panel 4, an hollow lip 53 having a hollow portion 53a in contact with the outer circumferential end face of the sunroof panel 4, and an outer side lip 54 having a hollow portion 54a in contact with an inner circumferential face of the sunroof opening portion of the roof panel 1.

The weather strip 5 is formed of, for example, rubber such as solid rubber of ethylene propylene rubber or chloroprene rubber and foamed sponge rubber or soft resin such as soft chloroethene resin and is mounted from above by fitting the leg portion 51 having a slit-like groove between the leg portion 51 and the body portion 50 to the mounting flange 31 of the frame 3.

A surface side lip 52 extends from an upper end portion of the leg portion 51 to the inner circumferential side and comes into elastic area contact with the surface of the sunroof panel 4. Also, the hollow lip 53 is provided on the inner circumferential surface side of the leg portion 51. Two wall plates 53b and 53c forming the hollow portion 53a extend from the leg portion 51, respectively and are bent in intermediate portions thereof to integrated together at the tip end portions.

More specifically, the hollow lip 53 is formed substantially into a V-shape in hollow cross sectional shape provided with a plurality of bent portions and may be collapsed (bent) with the bent portions as the starting point. The tip end portions of the wall plates 53b and 53c bonded together are in elastic area contact with the outer circumferential end face of the sunroof panel 4. Then, the outer circumferential end face of the sunroof panel 4 is sealed by means of the surface side lip 52 and the hollow lip 53.

Grooves 55 are formed over the entire circumference for assisting the collapsing action of the hollow lip 53 in the bent portions formed in the intermediate projecting way of the wall plates 53b and 53c of the hollow lip 53. Namely, in the assembling work of the sunroof panel 4 to be described later, the grooves 55 are provided for collapsing the hollow lip 53 toward the leg portion 51 without fail. Incidentally, the grooves 55 may be formed in the outer and inner surfaces of the wall plates 53b and 53c as desired.

On the other hand, the outer side lip 54 having the hollow portion 54a is provided on the outer circumferential surface of the body portion 50. When the sunroof opening portion of the roof panel 1 is to be closed, the outer side lip 54 is brought into elastic area contact with the inner circumferential face portion of the opening portion to thereby seal the inner circumferential surface of the opening portion.

By the way, the sunroof panel 4 made of synthetic resin has a higher linear expansion coefficient than glass and expands or shrinks in the area direction in accordance with the temperature change. In order to cope with this expansion/shrinkage, semi-cure type adhesives are used as the adhesives 6 for bonding the sunroof panel 4 to the frame 3 to thereby allow the relative shift of the sunroof panel 4 to the frame 3. Namely, the sunroof panel 4 is bonded relatively movably to the frame 3. Also, the hollow lip 53 that is in contact with the outer circumferential end face of the sunroof panel 4 is elastically deformed by itself while holding the contact condition to cope with the expansion/shrinkage of the sunroof panel 4.

Elastic seal material 7 having elasticity and viscosity is filled in a space defined by the outer circumferential end face of the sunroof panel 4, the hollow lip 53 and the frame 3. It is preferable to use as the elastic seal material 7 elastic material such as a rubber hot melt seal that does not generate a high stress even if the sunroof panel 4 is thermally expanded to be kept under the compressed condition, or does not peel from the sunroof panel 4 or the hollow lip 53 or does not cause the material fraction even if the sunroof panel 4 is thermally shrunken to be subjected to the tension effect. Thus, the sealability between the sunroof panel 4 and the frame 3 is enhanced.

With such a panel mounting structure of the sunroof 2, in the case where the sunroof panel 4 is thermally expanded or thermally shrunken, the hollow lip 53 is elastically deformed to cope with the expansion/shrinkage. Also, the elastic seal material 7 deforms in correspondence with the elastic deformation of the hollow lip 53 and the expansion/shrinkage of the sunroof panel 4 to thereby make it possible to keep a predetermined sealability without generating the problem of peel or fraction.

Figure 3A:
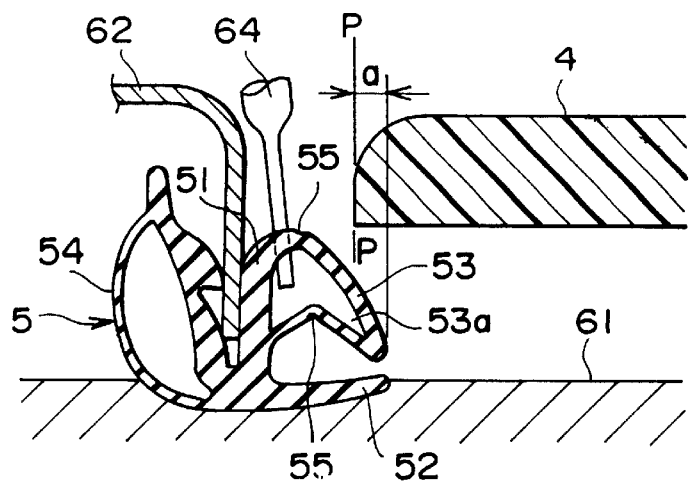
FIGS. 3A to 3F are cross-sectional views showing an assembling method of a sunroof panel in the step order.

A method of assembling the sunroof panel 4 will now be described with reference to FIGS. 3A to 3F. As shown in FIG. 3A, first of all, the weather strip 5 is set on a receiving jig 61 by a weather strip positioning jig 62 under the reversed condition (inverted condition) with the back surface upwardly. In this case, the amount a of lap is set so that the tip end of the hollow lip 53 is partially overlapped with the edge of the sunroof panel 4. The amount a of lap is set in order to absorb the positional displacement in assembling or to keep the sealability under the assembled condition (to bring the hollow lip 53 into elastic contact with the panel end face).

Thereafter, a suction needle 64 connected to a vacuum pump (not shown) is put into the hollow lip 53 of the weather strip 5 to suck the air within the hollow portion 53a.

In accordance with this suction, the bent portions of the hollow lip 53 are collapsed toward the leg portion 51 while the hollow portion 53a is crashed. In this case, in this embodiment, the grooves 55 are provided in the upper and lower bent portions that are the intermediate projection portions from the hollow lip 53. Therefore, the hollow lip 53 may be collapsed smoothly without fail.

Figure 3B:
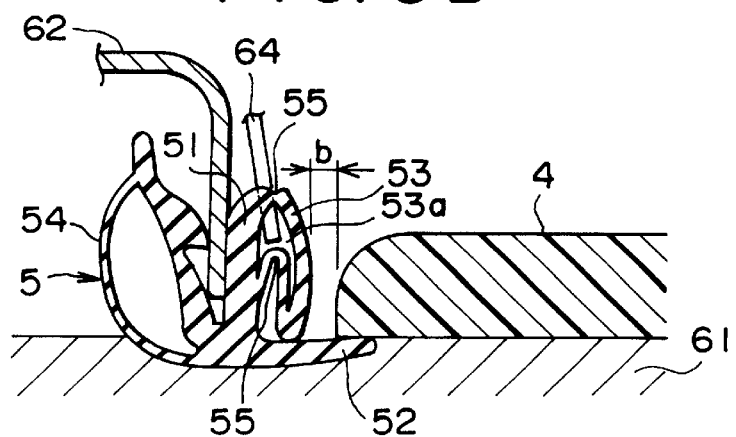

Also, since the upper and lower bent portions and the grooves 55 formed therein are set in positions at predetermined intervals from the insertion locus (P—P line shown) of the sunroof panel 4, as shown in FIG. 3B, in accordance with the collapse, a predetermined interval b is formed between the end face of the hollow lip 53 and the end face of the sunroof panel 4.

Accordingly, thereafter, as shown in FIG. 3B, if the sunroof panel 4 held by the panel depressing jig (not shown) under the condition with the back surface upwardly is inserted into the weather strip 5 from above, it is possible to bring the panel into contact with the surface side lip 52 of the weather strip 5 without biting the hollow lip 53 by the panel outer circumferential edge.

Figure 3C:
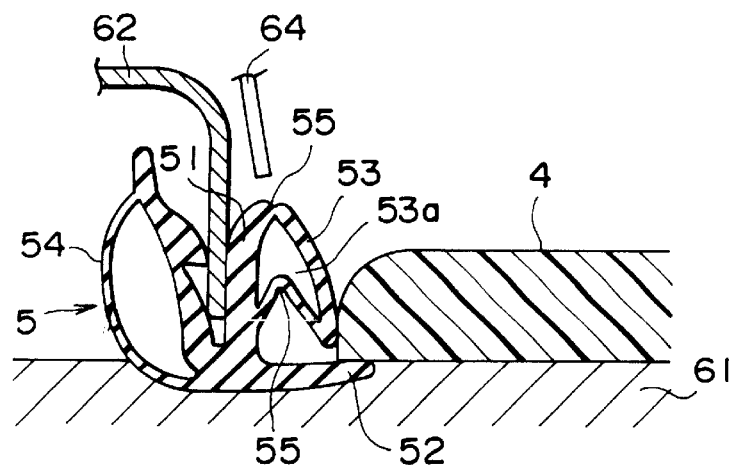

Then, if the air absorption of the suction needle 64 is interrupted after the insertion of the sunroof panel 4 and the suction needle 64 is drawn off, as shown in FIG. 3C, the air is introduced from the needle locus (hole) of the suction needle 64 to the hollow portion 53a so that the hollow lip 53 is returned back elastically. Thus, the projecting end portion of the hollow lip 53 is brought into elastic area contact with the outer circumferential end face of the sunroof panel 4.

Figure 3D:
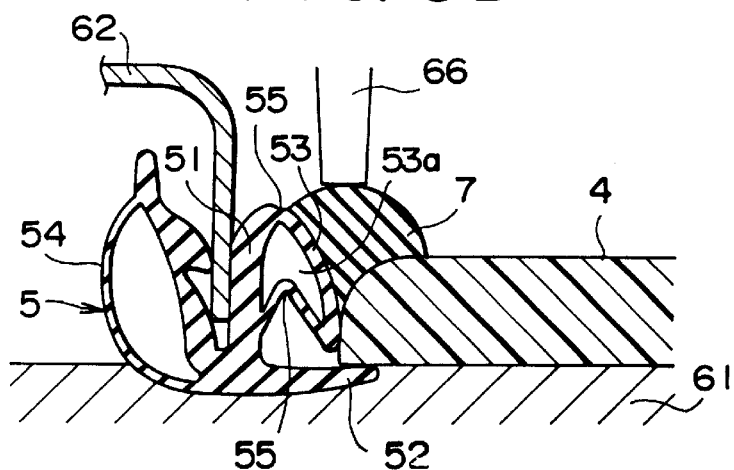
Figure 3E:
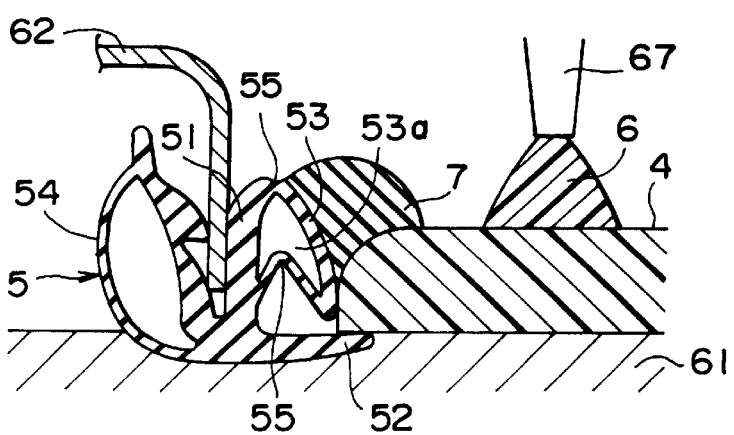
Figure 3F:
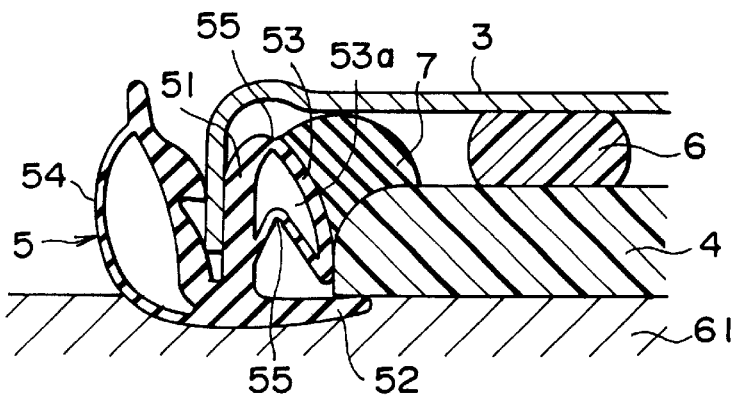

Thereafter, as shown in FIG. 3D, the elastic seal material 7 is applied through a seal material applicator nozzle 66 over the entire circumference between the outer circumferential end face of the sunroof panel 4 and the slant surface of the hollow lip 53 of the weather strip 5. Subsequently, the adhesives 6 are applied through an adhesive applicator nozzle 67 on an entire circumference of the portion inside of the edge of the back surface (top surface) of the sunroof panel 4 as shown in FIG. 3E. Then, after the weather strip positioning jig 62 is removed, as shown in FIG. 3F, the frame 3 is reversed and the mounting flange 31 is inserted into the groove of the leg portion 51 of the weather strip 5. At this time, the adhesives 6 are bonded to the back surface of the frame 3 and the elastic seal material 7 is adhered. Incidentally, it is not always necessary to adhere the elastic seal material 7 to the frame 3.

Thus, the sunroof panel 4 is assembled to the frame 3 and the weather strip 5.

By the way, only with the bent structure of the hollow lip 53, it is not always that the tip end of the hollow lip 53 is bent toward the leg portion 51 upon the above-described removal of the air. However, in the embodiment, since the grooves 55 are provided over the entire circumference at two upper and lower positions of the bent portions of the hollow lip 53, it is possible to ensure, without fail, the collapse in the predetermined form of the hollow lip 53 upon the removal of the air over the entire circumference.

Second Embodiment

Figure 4:
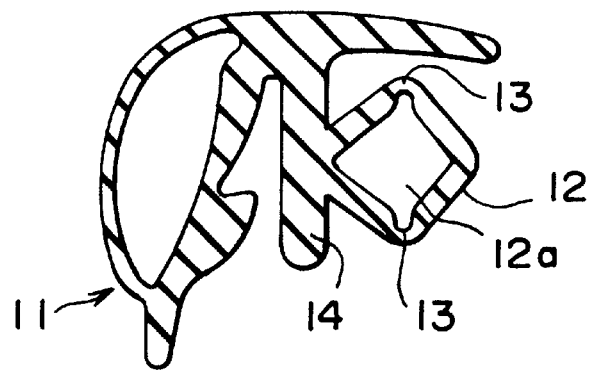
FIG. 4 is a cross-sectional view showing a weather strip in accordance with a second embodiment.

A second embodiment of the present invention will now be described. In the first embodiment, it is possible to use a weather strip 11 shown in FIG. 4 may be used instead of the weather strip 5. The weather strip 11 is formed to have a hollow lip 12 having substantially a rhombus shape in cross section. Grooves 13 are formed at the upper and lower bent portions for assisting the collapse, respectively. Even if such a weather strip 11 is used, it is possible to collapse the hollow lip 12 toward a leg portion 14 by sucking the air within a hollow portion 12a of the hollow lip 12 in the same manner as in the first embodiment. Under this condition, the sunroof panel 4 is inserted into the weather strip 11 to thereby prevent the biting of the hollow lip 12 upon assembling the panel.

In brief, the cross-sectional shape of the hollow lip 53, 12 may be hollow and collapsed but is not always limited to those shown in the drawings. Also, the cross-sectional shape of the grooves 55, 13 is not limited to the semi-circular shape shown in the drawings. However, it is preferable that the shape be such a shape that the stress concentration may be suppressed as much as possible when the hollow lip 53, 12 may operate to follow the expansion/shrinkage of the sunroof panel 4.

Third Embodiment

Figure 5A:
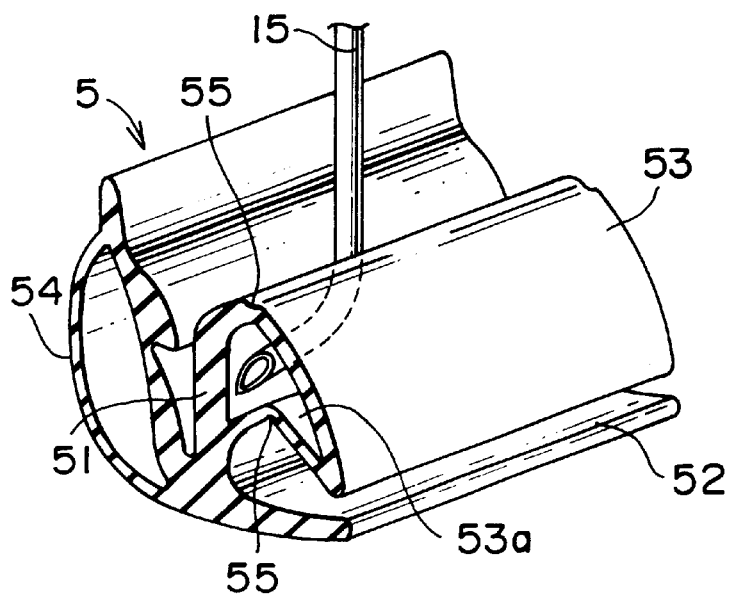
FIG. 5A is a perspective view showing a suction needle in accordance with a third embodiment.
Figure 5B:
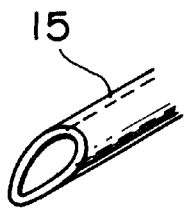
FIG. 5B is an enlarged view showing the suction needle shown in FIG. 5A.

In the first embodiment, it is possible to use a suction needle 15 bent substantially into an L-shape as shown in FIG. 5A instead of the suction needle 64 for removing the air of the hollow lip 53. Such a suction needle 15 is used and the needle tip is inserted into the hollow lip 53 along the longitudinal direction of the hollow tip 53 to thereby make it possible to suck the air in the longitudinal direction of the hollow lip 53. Also, in the case where the hole is formed simultaneously when the needle is inserted into the hollow lip 53, if a tip end of the suction needle 64 is cut obliquely as shown in FIG. 5B, it is possible to prevent the clogging of the suction needle 15 by the cutaway portion that is generated when the hole is formed.

The overall shape or the needle tip shape of the suction needle 64, 15 to be used to suck the air of the hollow lip 53 or the insertion position and the number of the suction needle 64, 15 may be set as desired.

Fourth Embodiment

Figure 6:
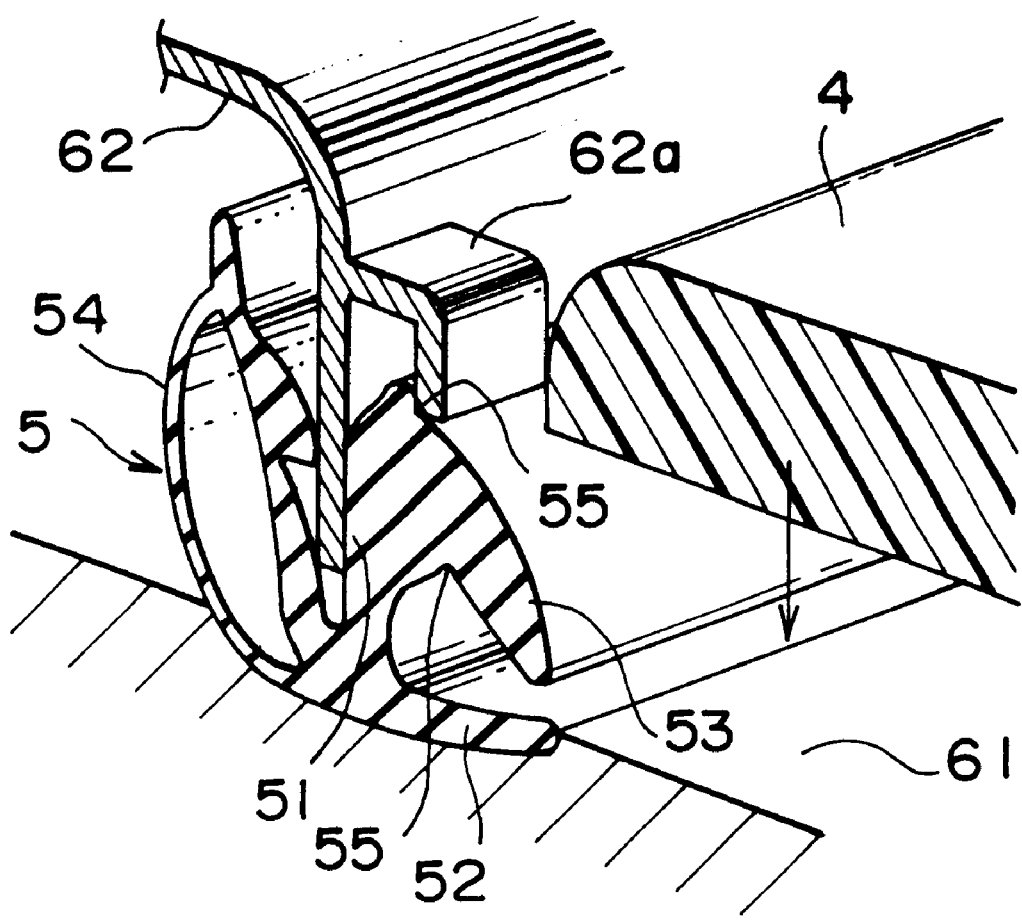
FIG. 6 is a view showing a lip biting preventing method by an assisting jig.
Figure 7A:
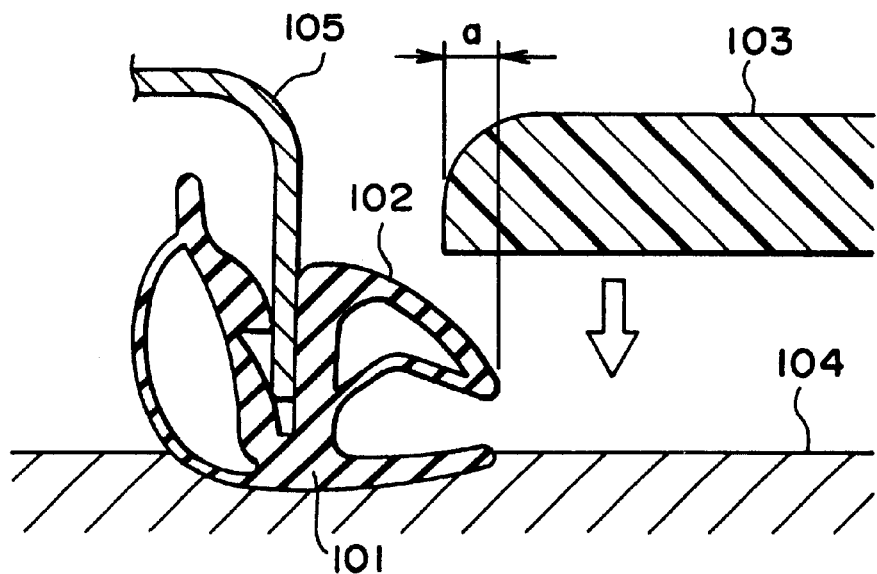
FIGS. 7A and 7B are cross-sectional views showing a conventional panel assembling work in the step order.
Figure 7B:
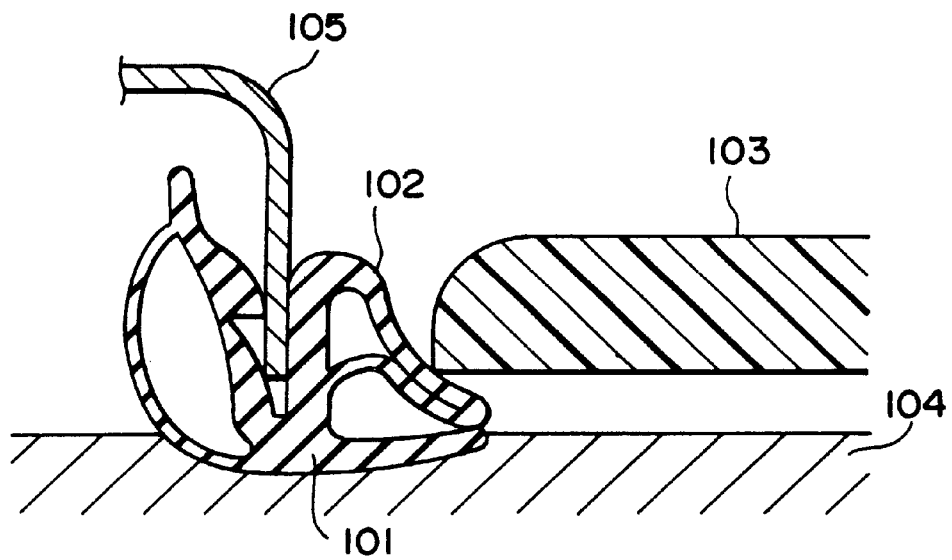

In the hollow lip 53 formed in the weather strip 5, a place where the hollow portion 53a is not formed due to the molding property is present (in general, the joint portion or the like for joining the extruded and molded weather strip 5 in the form of a loop). In such a place, as shown in, for example, FIG. 6, an L-shaped assisting jig 62a is provided in the weather strip positioning jig 62. The tip end of this assisting jig 62a is held by being hooked at the groove 55 of the hollow lip 53 on the upper side in the drawing. It is thus possible to pass the panel end face without being entrained at the end portion of the hollow lip 53 in assembling the sunroof panel 4.

Incidentally, in each of the foregoing embodiments, the case where the invention is applied to the sunroof 2 is described. However, the present invention is limited thereto and may be applied to, for example, a quarter window. Also, the sunroof panel 4 is made of resin but may be made of glass. In case of the glass, there is difference in linear expansion coefficients between the glass and the metal frame, so that a relative shift at the end portion is generated. Thus, the present invention is applied thereto to eliminate the problem. Also, the invention is not limited to the case where the grooves are formed at two upper and lower positions of the hollow lip and the grooves may be formed in all the bent portions.

Also, in the panel assembling method, in the external force applying means for applying force for collapsing the hollow lip, the air suction system described in the embodiments may be changed to, for example, a system in which a jig such as a plate having an L-shape in cross section is used so that the tip end of the hollow lip is pressurized from the outside toward the leg portion, or a system in which the component generated in the lateral direction generated when the slant surface of the hollow lip is pressurized by the end face of the panel upon the insertion of the panel is utilized as the external force.

What is claimed is:

1. A light transmitting panel mounting structure for mounting a light transmitting panel comprising:
    a frame having a mounting flange;
    a light transmitting panel bonded relatively movably to said frame; and
    a weather strip held by the mounting flange of said frame for sealing a space between said frame and said light transmitting panel, said weather strip including:
        a body portion;
        a leg portion extending from said body portion to face said body portion for clamping the mounting flange of said frame in cooperation with said body portion; and
        a hollow lip having a hollow cross-sectional shape formed by two wall plates and projecting from said leg portion in elastic contact with an end face of said light transmitting panel, each of the two wall plates having a bent portion that is collapsible while shifting toward said leg portion when said hollow lip is subjected to an external force, each of said bent portions being provided with a groove for assisting the collapsing action.

2. A structure according to claim 1, wherein the external force is atmospheric pressure applied when the air within the hollow portion of said hollow lip is removed.

3. A structure according to claim 1, wherein said grooves are provided in a position at a predetermined distance away from the end face of said light transmitting panel when said light transmitting panel is assembled to said weather strip.

4. A structure according to claim 1, wherein said hollow lip has a slant portion in a direction for assembling said light transmitting panel.

5. A structure according to claim 1, wherein said hollow lip is formed into substantially a V-shape in hollow cross section.

6. The structure according to claim 1, wherein said hollow lip is formed into substantially a rhombus shape in hollow cross section.

* * * * *